United States Patent [19]

Kawasaki et al.

[11] Patent Number: 4,853,579
[45] Date of Patent: Aug. 1, 1989

[54] DRIVE METHOD FOR ULTRASONIC MOTOR PROVIDING ENHANCED STABILITY OF ROTATION

[75] Inventors: Osamu Kawasaki, Kyoto; Katsu Takeda, Osaka; Ritsuo Inaba, Osaka; Tetsuji Fukada, Osaka, all of Japan

[73] Assignee: Matsushita Electric Industrial Co., Ltd., Japan

[21] Appl. No.: 89,334

[22] Filed: Aug. 25, 1987

[30] Foreign Application Priority Data

Aug. 26, 1986 [JP] Japan .................. 61-199630
Aug. 26, 1986 [JP] Japan .................. 61-199633
Aug. 26, 1986 [JP] Japan .................. 61-199634

[51] Int. Cl.⁴ .......................................... H01L 41/08
[52] U.S. Cl. .................... 310/116; 318/116; 310/323
[58] Field of Search ............... 310/316, 317, 323, 328; 318/116, 118

[56] References Cited

U.S. PATENT DOCUMENTS

| | | | |
|---|---|---|---|
| 4,175,242 | 11/1979 | Kleinschmidt | 310/316 |
| 4,275,363 | 6/1981 | Mishiro et al. | 310/316 X |
| 4,277,758 | 7/1981 | Mishiro | 310/316 X |
| 4,510,411 | 4/1985 | Hakamata et al. | 310/323 X |
| 4,551,690 | 11/1985 | Quist | 310/316 X |
| 4,554,477 | 11/1985 | Ratcliff | 310/316 |
| 4,562,413 | 12/1985 | Mishiro et al. | 310/316 X |
| 4,626,728 | 12/1986 | Flachenecker et al. | 310/316 |
| 4,641,053 | 2/1987 | Takeda | 310/316 |
| 4,658,172 | 4/1987 | Izukawa | 310/323 X |
| 4,689,515 | 8/1987 | Benndorf et al. | 310/316 |
| 4,692,649 | 9/1987 | Izukawa et al. | 310/323 X |
| 4,703,213 | 10/1987 | Gasler | 310/316 |
| 4,713,571 | 12/1987 | Suzuki et al. | 310/328 |

FOREIGN PATENT DOCUMENTS 61-251490 11/1986 Japan .
2146806 4/1985 United Kingdom .

Primary Examiner—Mark O. Budd
Attorney, Agent, or Firm—Lowe, Price, LeBlanc, Becker & Shur

[57] ABSTRACT

A method of driving an ultrasonic motor having a rotation body (6) which is rotated by travelling waves generated in a vibrator body (3), whereby the drive frequency of the motor is controlled in accordance with the value of an operating parameter such as phase difference between drive current and voltage, such as to maintain the drive frequency at a value which is lower than the antiresonance frequency of the vibrator body (3) and higher than a highest resonance frequency of the vibrator body (3) in a hysteresis loop exhibited by a resonance frequency characteristic of the vibrator body (3). Continuous stable operation is attained, irrespective of the effects of temperature and load changes upon the motor operating characteristics.

9 Claims, 7 Drawing Sheets

DRIVE METHOD FOR ULTRASONIC MOTOR PROVIDING ENHANCED STABILITY OF ROTATION

BACKGROUND OF THE INVENTION

The present invention relates to an improved method of driving an ultrasonic motor in which motive force is produced by elastic travelling waves generated by vibration of a piezoelectric body.

An ultrasonic motor, (for example as described in U.S. patent application Ser. No. 706387) consists of a vibration body which is formed of a piezoelectric body and an elastic body, and a rotation body which is disposed in pressure contact with the vibration body. By applying an alternating electric field to the piezoelectric body, elastic travelling waves are generated by vibration of the vibration body, whereby the rotation body is rotated by the effects of frictional force.

The resonance characteristic of the vibration body is almost identical to that of the piezoelectric body alone. As a result, efficient driving operation with a minimum level of field strength can be attained by driving with an alternating electric field whose frequency is close to the resonance frequency of the vibration body. However since the resonance frequency of the vibration body will vary in accordance with operating temperature and motor load, corresponding changes will occur in the relationship between drive frequency (i.e. the frequency of the alternating electric field) and the resonance frequency of the vibration body. With prior art methods of driving such an ultrasonic motor, therefore, changes in temperature and load will result in variations in the operating characteristics of the motor, so that it is not possible to maintain a high efficiency of driving the motor. In addition, since a fixed drive frequency and fixed level of drive voltage are applied to the ultrasonic motor with such prior art drive methods, such changes in the operating characteristics due to temperature or load variations may result in changes in the speed of rotation of the motor, i.e. stable operation cannot be ensured with respect to such temperature and load variations.

SUMMARY OF THE INVENTION

It is an objective of the present invention to overcome the disadvantages of prior art drive methods of driving an ultrasonic motor, by providing a drive method whereby stable operation of the motor is continuously ensured, irrespective of changes in temperature or motor load.

With the method of the present invention, the value of a specific operating parameter of the ultrasonic motor is detected, and the frequency of an alternating drive voltage applied to the motor is controlled such as to maintain this detected value at an arbitrary value within a predetermined range, which corresponds to a range of frequencies of the alternating drive voltage within which stable operation of the motor is ensured. The vibration body of such an ultrasonic motor exhibits non-linearity of operation, resulting in a hysteresis loop appearing in the relationship between resonance frequency of the vibration body and the drive voltage frequency, and the aforementioned range of alternating drive voltage frequencies extends from a frequency that is higher than a highest value of resonance frequency in the hysteresis loop to a frequency that is lower than an antiresonance frequency of the vibration body. The operating parameter whose value is used to control the drive frequency is preferable selected as a phase difference between alternating drive voltage and the resultant current which flows in the piezoelectric body, a component of the drive current that is effective in driving the motor, or the speed of rotation of the motor.

DESCRIPTION OF THE PREFERRED EMBODIMENTS

Figure 1:
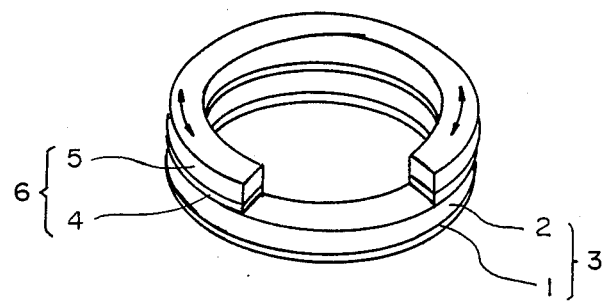
FIG. 1 is an oblique cut-away view of a ring-type ultrasonic motor.

FIG. 1 is an oblique cut-away view of an example of a ring-type ultrasonic motor. Numeral 1 denotes a piezoelectric body which is formed of a material such as piezoelectric ceramic, which is fixedly attached to an elastic body formed of a material such as iron or aluminum. The piezoelectric body 1 and elastic body 2 are oriented mutually concentric and mutually attached by adhesive means, to form a vibration body 3. Numeral 4 denotes an anti-abrasion friction body and 5 denotes an elastic body which is adheringly attached to the friction body 4. The friction body 4 and elastic body 5 in combination form a rotation body 6. The vibration body 3 and the rotation body 6 are in pressure contact through the friction body 4.

Figure 2:
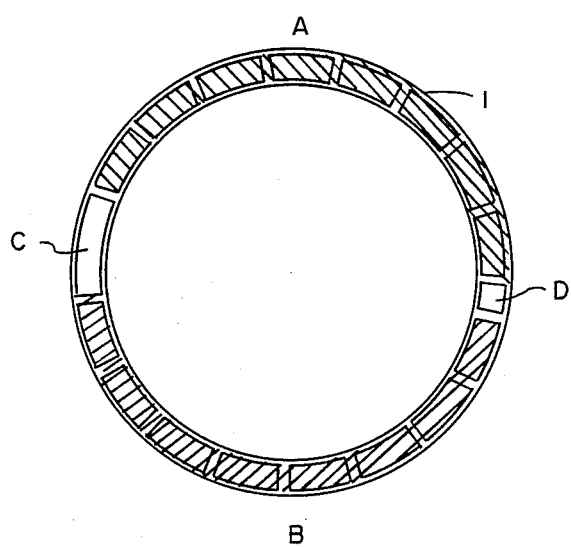
FIG. 2 is a plan view to illustrate an arrangement of drive electrodes of a piezoelectric body in the motor of FIG. 1.

FIG. 2 is a plan view of the piezoelectric body 1 of the ultrasonic motor of FIG. 1, showing the arrangement of electrodes of the piezoelectric body 1. A and B respectively denote two sets of electrodes, which will be referred to as small electrodes, each of which has a circumferential length which is equal to one-half of the wavelength of the elastic travelling waves. A "beta" electrode is formed on the opposite side of the piezoelectric body 1 to that shown in FIG. 2, i.e. an annular electrode extending continuously around the circumference of body 1. C and D denote electrodes whose circumferential lengths respectively correspond to ¾ and ¼ of the wavelength of the elastic travelling waves. The electrodes C and D are provided only in order to separate the sets of electrodes A and B by 90° (with respect to position), and can be omitted. The piezoelectric body 1 has sequentially arranged polarized regions, each disposed below a corresponding one of the small electrodes of the sets A and B, successive ones of which are alternately polarized in the direction of the thickness of the piezoelectric body 1 such as to respond to an applied electric field by movement in mutually opposite directions. These polarized regions of the piezoelectric body 1 are formed permanently, at the stage of manufacture.

The electrodes of group A are mutually connected in common, as are the electrodes of group B, as indicated by the hatched-line portions of FIG. 2. If the electrode groups A and B are respectively driven by alternating drive voltages which mutually differ in phase by 90° with respect to time, then since the electrode groups A and B mutually differ in phase by 90° with respect to position, two modes of flexural vibration of vibration body 3 will be produced, which differ in phase (both with respect to position and with respect to time) by 90°. As a result, flexural vibration travelling waves will be produced circumferentially around the vibration body 3, whereby the rotation body 6 which is in pressure contact with the vibration body 3 through the friction body 4, will be rotated as a result of frictional forces produced by the travelling waves.

Figure 3:
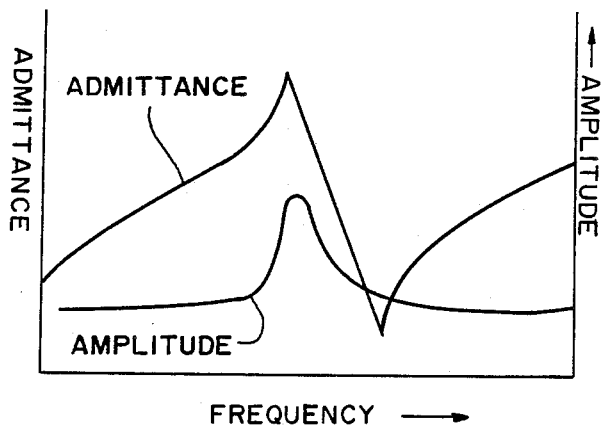
FIG. 3 shows frequency characteristics of admittance and vibration amplitude for the vibration body of the motor of FIG. 1.

Since the speed of rotation of such an ultrasonic motor is proportional to the amplitude of these travelling waves, it is necessary that the drive frequency be close to the resonance frequency of the vibration body 3. FIG. 3 is a diagram showing the frequency characteristic of the admittance of the vibration body 3, as seen from the drive input terminals (e.g. between the electrode group A and the "beta" electrode) and the frequency characteristic of the amplitude of the vibration of the vibration body 3 when driven with a constant level of alternating drive voltage.

Figure 4:
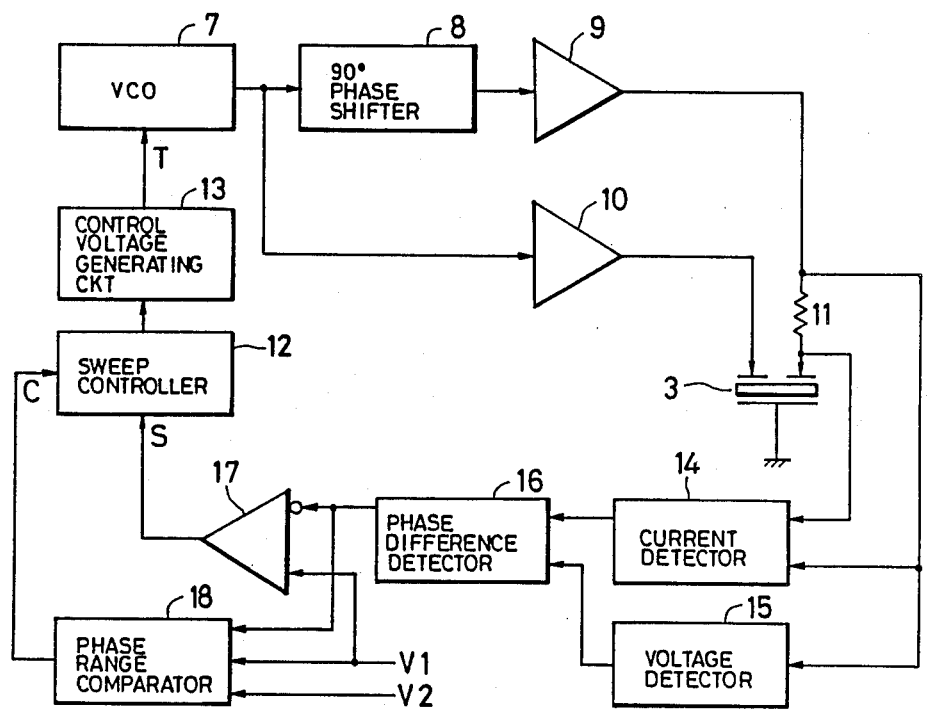
FIG. 4 is a block schematic diagram of a circuit for implementing an embodiment of a method of driving an ultrasonic motor according to the present invention.

FIG. 4 is a block schematic diagram of a circuit for implementing a first embodiment of a method of driving an ultrasonic motor according to the present invention. This embodiment will be described referring to FIG. 5, which shows characteristics representing relationships between drive frequency and drive current, phase difference between drive voltage and current, and motor speed of rotation when a fixed amplitude of drive voltage is applied to the vibration body. When operation of this circuit is started, a control signal produced from a sweep controller 12 is applied to a control voltage generating circuit 13, causing the control voltage generating circuit 13 to produce a sweep voltage (e.g. a ramp-waveform voltage). This sweep voltage is applied to a control terminal T of a voltage control oscillator (abbreviated in the following to VCO) 7, which responds by executing frequency sweeping of an output signal produced therefrom in accordance with the sweep voltage, from a high frequency downwards, within a predetermined sweep range which is within a range extending from a frequency $f_3$ shown in FIG. 5 (which is higher than the antiresonance frequency $f_5$ of the vibration body) to a frequency $f_4$ (which is lower than the resonance frequency $f_1$ of the vibration body). The output signal from the VCO 7 is applied through a 90° phase shifter 8 to a power amplifier 9, and is also applied directly to the input of a power amplifier 10. The power amplifiers 9 and 10 provide appropriate amplification for producing a requisite level of alternating drive voltage to drive the vibration body 3. The outputs from power amplifiers 9 and 10 are respectively applied to the electrode groups A and B of the vibration body 3, to thereby drive the vibration body 3.

One input terminal of the piezoelectric body 1 is connected through a resistor 11 to the output of the power amplifier 9. The waveform of current which flows in the piezoelectric body 1 is thereby detected as a voltage which appears across the terminals of the resistor 11, by a current detector 14. The waveform of the alternating drive voltage applied to the piezoelectric body 1 is detected by a voltage detector 15. A phase difference detector 16 is coupled to receive detection outputs thereby produced from the current detector 14 and voltage detector 15, to produce a voltage which varies in proportion to the phase difference between the drive current and voltage of the piezoelectric body 1, and this output from the phase difference detector 16 is supplied to an inverting input of a phase comparator 17 and to one input of a phase range comparator 18. A preset voltage level V1 is applied to one of two non-inverting input terminals of the phase comparator 17, with this voltage corresponding to a value of phase difference between drive current and voltage that is indicated as P1 in FIG. 5. During sweeping of the drive frequency as described above, when the output voltage from the phase difference detector 16 reaches a value that is identical to V1, i.e. when the phase difference value P1 is detected, then the output from the phase comparator 17 goes from the L (low) to the H (high) logic level. This output of the phase comparator 17 is applied to a control input terminal S of the sweep controller 12, and as a result of this transition of the phase comparator 17 output to the H logic level, the sweep controller 12 acts to control the control voltage generating circuit 13 such that sweeping of the output signal frequency of the VCO 7 is halted, i.e. the output signal frequency being produced by the VCO 7 at that point in time is held fixed.

Figure 5:
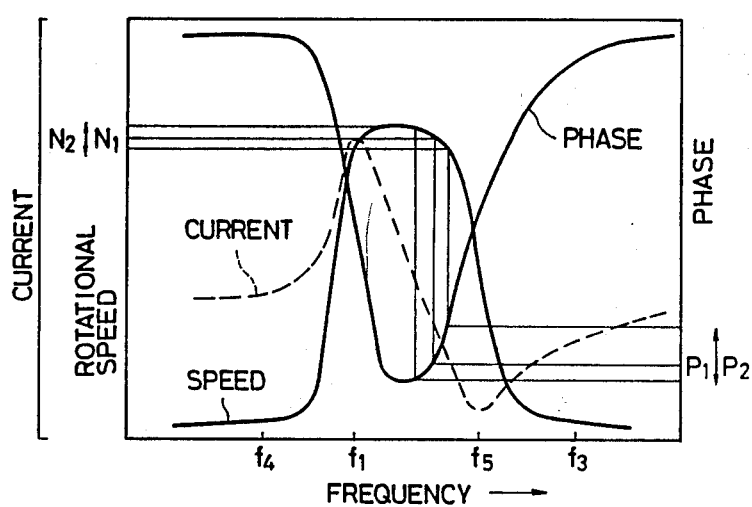
FIG. 5 shows frequency characteristics of a phase difference between drive voltage and current, and of rotational speed of a rotation body, when the vibration body of an ultrasonic motor is driven at a fixed drive voltage level.

The remaining input terminal of the phase range comparator 18 is coupled to receive a preset voltage V2 which corresponds to a permissible range of values of the phase difference between drive current and voltage of the vibration body 3, this permissible range of variation being indicated as P2 in FIG. 5. If the output signal from the phase difference detector 16 should deviate from the preset voltage V1 by an amount exceeds this range of variation that is set by the voltage V2, then the output from the phase range comparator 18 goes from the L to the H logic level. This output of the phase range comparator 18 is applied to a control input terminal C of the sweep controller 12, and the transition of this output to the H logic level causes the sweep controller 12 to control the control voltage generating circuit 13 such as to restart sweeping of the output signal frequency of the VCO 7, over the predetermined frequency range described above for the case of starting of operation of the circuit. This sweeping operation is subsequently halted when an appropriate value of drive frequency is reached, as described hereinabove. In this way, the frequency of the alternating drive voltage which is applied to the piezoelectric body 1 of the ultrasonic motor is continuously maintained at a value such that the phase difference between the drive current and voltage is held within a predetermined range, irrespective of changes in the resonance frequency of the vibration body 3 resulting from variations in temperature or load applied to the motor.

Figure 6:
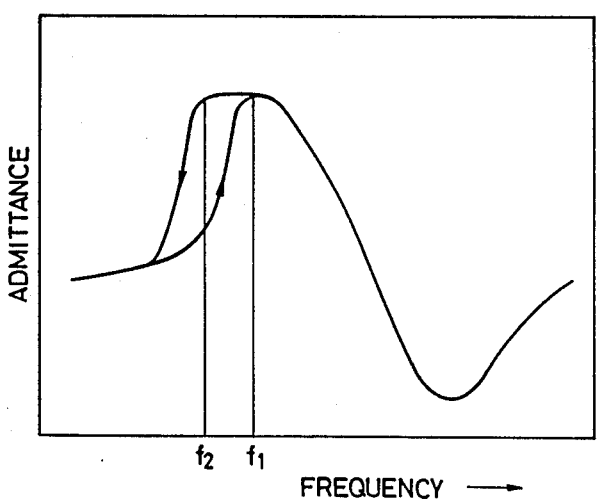
FIG. 6 is a frequency characteristic to illustrate a non-linear relationship between admittance and frequency, for a vibration body of an ultrasonic motor.

FIG. 6 shows the relationship between drive frequency and the admittance of the vibration body 3, to illustrate the hysteresis loop mentioned hereinabove. If the drive frequency is swept from a low to a high frequency, then a value of resonance frequency $f_1$ of the vibrator body is reached (i.e. the highest resonance frequency of the hysteresis loop). If the drive frequency is swept from a high frequency downward, then a lower value of resonance frequency designated as $f_2$ is reached. The resonance frequency $f_1$ is indicated in FIG. 5, In this way, the circuit ensures that the drive frequency applied to the vibration body 3 is held within a specific range (i.e. the range of frequencies corresponding to the phase range P2 described above) that is higher than the highest value of resonance frequency ($f_1$) of the vibration body 3 in the hysteresis loop that is exhibited by the resonance frequency/drive frequency characteristic of the vibration body 3 (due to non-linearity of operation of the vibration body 3), and which is lower than the antiresonance frequency ($f_5$) of the vibration body 3.

If the drive frequency is within or is close to the range $f_1$ to $f_2$ of the hysteresis loop shown in FIG. 6, the speed of rotation of the motor will tend to vary in accordance with changes in resonance frequency caused by changes in temperature or load. This makes it difficult to attain stable operation by using a prior art drive method for an ultrasonic motor, in which the drive frequency is fixed at a predetermined value, which must of necessity be close to the aforementioned resonance frequency hysteresis loop, in order to attain a sufficiently high speed of rotation. At drive frequencies which are substantially lower than frequency $f_2$, the speed of rotation of the rotation body rapidly falls, so that it is necessary to employ a drive frequency which is within a region that is higher than the resonance frequency $f_1$. Moreover, as the drive frequency is reduced below the antiresonance frequency $f_5$ (shown in FIG. 5) of the vibration body, the rotational speed of the rotation body also rapidly falls. Thus, the drive frequency must be made lower than this antiresonance frequency $f_5$ and higher than the highest resonance frequency $f_1$.

With the embodiment of the present invention described above, the range of frequencies within which the drive frequency is swept (by operation of the VCO 7 as described hereinabove, from a high frequency downward) is within the range $f_3$ to $f_4$ shown in FIG. 5, and a predetermined value for the phase difference between the drive voltage and current is thereby established as P1 (corresponding to the value of preset voltage V1 described above), while the permissible range of variation of this phase difference is predetermined as a value P2 (corresponding to the value of preset voltage V2 described above). As a result, the speed of rotation of the rotation body 6 will be set to a value N1 (corresponding to the phase difference P1) by the frequency sweep process described above, and will be held within a range of variation N2 (corresponding to the range of phase variation P2). In this way, stable operation of the ultrasonic motor is attained, since the drive frequency is controlled to be within a range which is higher than the highest resonance frequency of the vibrator element (with respect to the hysteresis loop described above), and lower than the antiresonance frequency. If the operating temperature or motor load should change to such an extent that the resonance frequency of the vibration body changes, thereby changing the relationship between the drive frequency and the resonance frequency of the vibration body and s causing the phase difference between drive voltage and current to deviate from the preset value P1 and move outside the permissible range of variation P2, then sweeping of the drive frequency is restarted. The operations described hereinabove for the case of start-up of operation of the motor are then again executed, with sweeping of the drive frequency being halted when the phase difference between drive current and voltage has reached the value P1, i.e. when the speed of rotation of the mobile body has reached the value N1 within the range N2. In this way control is executed such that the phase difference between drive voltage and current is held within the preset range P2, so that a fixed relationship is maintained between the drive frequency applied to the motor and the resonance frequency of the vibration body, to thereby ensure stable operation of the motor.

Figure 7:
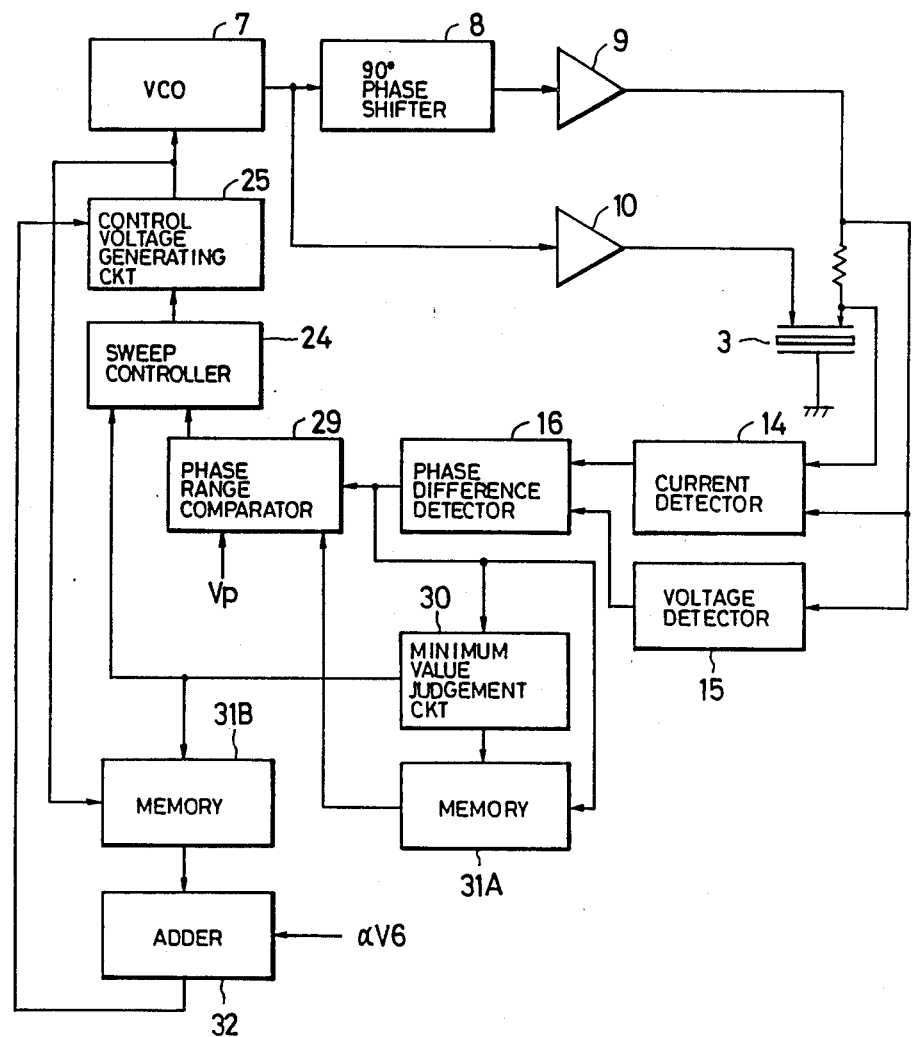
FIG. 7 is a block schematic diagram of a circuit for implementing a second embodiment of a method of driving an ultrasonic motor according to the present invention.

FIG. 7 is a block schematic diagram of a circuit for implementing a second embodiment of the method of driving an ultrasonic motor according to the present invention, which will be described referring to the admittance/frequency characteristic of the piezoelectric body 1 which is shown in FIG. 6. In FIG. 7, the VCO 7, 90° phase shifter 8, power amplifier 9, power amplifier 10, resistor 11, current detector 14, voltage detector 15 and phase difference detector 16 respectively correspond in function and connection to the identically designated blocks in the example of FIG. 4, described above, and further description of these will be omitted. A sweep controller 24 produces a control voltage which determines the frequency of the output signal produced from the VCO 7, while a sweep controller 24 functions to control the generation of a frequency sweep control voltage from the sweep controller 24, i.e. to initiate the generation of the frequency sweep control voltage and to subsequently halt the sweeping.

When operation of the circuit is started, a sweep controller 24 causes a control voltage generating circuit 25 to generate a sweep voltage which is applied to the control input terminal T of the VCO 7. The frequency of the output signal produced from the VCO 7 is thereby swept from a low frequency towards a high frequency within a predetermined sweep range, which extends at least from a frequency substantially lower than the lower resonance frequency $f_2$ shown in FIG. 6 to a frequency which is substantially higher than the higher resonance frequency $f_1$. A signal representing the resultant waveform of drive current of the piezoelectric body 1 of the ultrasonic motor is thereby applied from the current detector 14 to an input terminal of the phase difference detector 16, while an output signal representing the waveform of drive voltage is applied from the output of the voltage detector 15 to the other input of the phase difference detector 16, which thereby produces an output voltage varying in proportion to the phase difference between the drive current and voltage applied to the vibration body 3. This voltage is applied to one input of a phase range comparator 29 and also to the input of a minimum value judgement circuit 30 and to a memory 31A. The minimum value judgement circuit 30 functions to detect when the value of phase difference between the drive current and voltage attains a minimum, which approximately corresponds to a value of drive frequency equal to the higher resonance frequency $f_1$ described hereinabove. When this minimum phase value is detected, an output signal is produced from the minimum value judgement circuit 30, which causes a second memory 31B to store the value of control voltage (this value being referred to in the following as V1) produced from the control voltage generating circuit 25 at that point in time. In addition, the output signal from the minimum value judgement circuit 30 is applied to an input of the sweep controller 24, which responds by halting sweeping of the drive frequency. The value of control voltage which is now held in the memory 31B is added to a preset voltage $\alpha V6$, by an adder 32. $\alpha$ is a factor within the range 0 to 1, while V6 is equal to (V5−V1'), where V5 is an assumed value for the output voltage from the phase difference detector 16 when the drive frequency corresponds to the antiresonance frequency $f_5$ and V1' is an assumed value of voltage V1 described above. That is, $\alpha V6 = \alpha(V5-V1')$. An output voltage Vd is thereby produced from the adder 32 which is given as:

$$Vd = V1 + \alpha V6$$

The difference between the resonance frequency $f_1$ and antiresonance frequency $f_5$ is substantially constant, irrespective of changes in the resonance frequency resulting from temperature or load variations, so that voltage Vd corresponds to an arbitrary value of drive frequency which is intermediate between the resonance frequency $f_1$ and antiresonance frequency $f_5$. The voltage Vd is applied as a control voltage through the control voltage generating circuit 25 to the control terminal T of the VCO 7, whereby the motor is driven at a drive frequency which is intermediate between the higher resonance frequency $f_1$ and the antiresonance frequency $f_5$.

The value of output voltage from the phase difference detector 16 is stored in the memory 31A in response to a second output signal from the minimum signal produced from the phase value judgement circuit 30. More specifically, the second output signal is arranged to be produced a given period of time after the detection of minimum phase difference so that phase difference information can be stored after the VCO 7 is stabilized. This value of stored voltage is thereafter applied to one input terminal of the phase range comparator 29, while a set voltage VP representing the amount of permissible variation of the phase difference between drive current and voltage is applied to another input terminal of the phase range comparator 29. If, after frequency sweeping has been halted and the drive frequency set to a suitable value as described above, the output voltage from the phase difference detector 16 should deviate from the voltage value stored in the memory 31A by more than an amount which is determined by the set voltage VP (e.g. should fall below the value of that stored voltage by an amount which is greater than the value of voltage VP), then a signal is applied from the phase range comparator 29 to a control terminal C of the sweep controller 24 whereby sweeping of the drive frequency is again initiated as described hereinabove for the case of starting operation of the circuit. A suitable value of drive frequency is thereby once more determined, which is higher than the resonance frequency $f_1$ and lower than the antiresonance frequency $f_5$.

As can be understood from FIG. 6, by sweeping the drive frequency from a low to a high frequency, the highest resonance frequency of the hysteresis loop in the resonance frequency/drive frequency characteristic of the vibration body 3 is detected by the operation of the minimum value judgement circuit 30. The drive frequency is then fixed at a value which is higher than that resonance frequency by a specific amount (determined by the set voltage $\alpha V6$), so that the ultrasonic motor operates in a region of stable drive frequency which is higher than the higher resonance frequency of the hysteresis loop and is lower than the antiresonance frequency of the vibration body. In this way, as for the first embodiment of the invention described above, stable operation of the ultrasonic motor is obtained irrespective of changes in the resonance frequency of the vibration body due to temperature or load variations, since the drive frequency is controlled such as to compensate for such changes.

Figure 8:
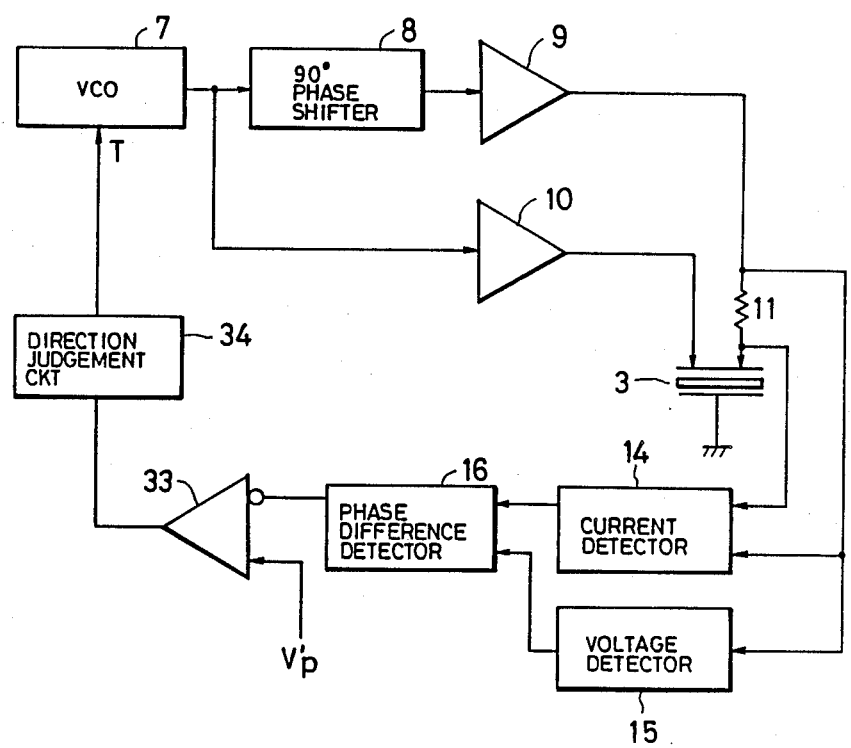
FIG. 8 is a block schematic diagram of a circuit for implementing a third embodiment of a method of driving an ultrasonic motor according to the present invention.

FIG. 8 is a block schematic diagram of a circuit for implementing a third embodiment of the method of driving an ultrasonic motor. In FIG. 8, components which are numbered from 6 through 16 correspond to the identically numbered components of the circuit of FIG. 4, and further description of these will be omitted. Numeral 33 denotes a phase difference amplifier, having an inverting input terminal which is coupled to receive the output voltage from the phase difference detector 16, corresponding to the phase difference between drive current and voltage and an input terminal which is coupled to receive a predetermined voltage $V_P$, that corresponds to a set value of phase difference between drive current and voltage. The phase difference amplifier 33 thereby produces an output voltage corresponding to the difference between a predetermined value of phase difference and the actual value of phase difference between drive current and voltage, at the current value of drive frequency. Numeral 34 denotes a direction judgement circuit which receives the output voltage produced from the phase difference amplifier 33, and produces a control signal that is applied to the control input terminal T of the VCO 7. This control signal designates whether frequency sweeping by the VCO 7 is to be executed upward from a low value of frequency, or downward from a high value of frequency, as determined by the output voltage from the phase difference amplifier 33, i.e. in accordance with the difference between the preset phase difference and the actual phase difference between drive current and voltage.

Figure 9:
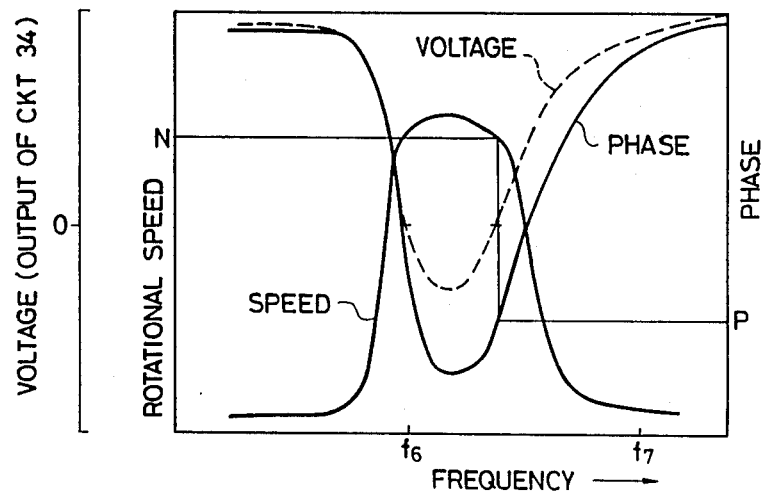
FIG. 9 shows frequency characteristics, for assistance in describing the operation of the embodiment of FIG. 8.

FIG. 9 is a diagram for assistance in describing the operation of the circuit of FIG. 8. The VCO 7 is controlled such that oscillation occurs in the range between frequencies $f_6$ and $f_7$ in FIG. 9. If the output frequency from the VCO 7 is higher than $f_7$, i.e. the drive frequency is higher than $f_7$, then the phase difference between drive voltage and current will be reduced to such an extend that control accuracy will be poor, and erroneous operation may occur. If the drive frequency should become lower than $f_6$, which corresponds to the phase represented by the preset voltage $V_P$, then the circuit applies control to the VCO 7 to increase the drive frequency such as to bring the phase difference represented by the output voltage from the phase difference detector 16 higher than the value represented by the set voltage $V_P$. That is to say, if the voltage produced from the phase difference amplifier 33 becomes negative, then the direction judgement circuit 34 will cause the VCO 7 to increase the drive frequency, while if the output voltage from the phase difference amplifier 33 is positive, the direction judgement circuit 34 causes the VCO 7 to lower the drive frequency. In this way, the phase difference between drive voltage and current is held at a value corresponding to the preset voltage $V_P$, so that stable operation of the ultrasonic motor is ensured. As in the previous embodiments, the range within which the drive frequency is held is determined such as to be higher than the highest resonance frequency of the hysteresis loop described above, and lower than the antiresonance frequency, of the vibrator body.

Figure 10:
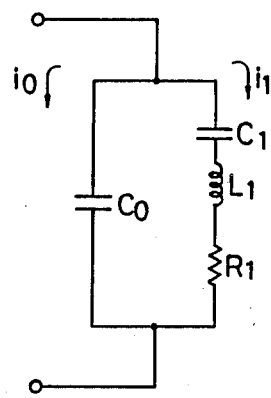
FIG. 10 is an equivalent circuit diagram of a vibration body of an ultrasonic motor.

In the above embodiments of the present invention, the frequency of the alternating drive voltage applied to the vibration body is controlled on the basis of a phase difference between drive current and voltage of the piezoelectric body. However it is also possible to control the drive frequency applied to the vibration body in accordance with the level of current which flows into the piezoelectric body of the vibration body and is effective in driving the vibration body. FIG. 10 is an equivalent circuit diagram of the piezoelectric body of an ultrasonic motor, as viewed from the input terminals of one set of electrodes (e.g. set A or B shown in FIG. 2). In FIG. 10, $C_0$ denotes the electrical capacitance of the electrodes, $C_1$ denotes elasticity, $L_1$ denotes mass, and $R_1$ denotes mechanical losses. $i_0$ denotes a charging current of the electrical capacitance $C_0$, while $i_1$ denotes the speed of vibration of the vibration body (i.e. the derivative of displacement with respect to time). Thus, $C_0$, $L_1$ and $R_1$ represent the mechanical system of the vibration body, and the component of the total drive current which flows into the arm of the equivalent circuit that is made up of these three quantities will be referred to as the effective drive current, for brevity of description. The speed of rotation of the rotation body of the motor is proportional to the level of this effective drive current $i_1$.

FIG. 8 shows the relationship between drive frequency and speed of rotation of an ultrasonic motor, together with the corresponding frequency characteristic of the effective drive current, defined above. The value of this current, when the rotational speed of the motor is the value indicated as N, is indicated as i.

Figure 12:
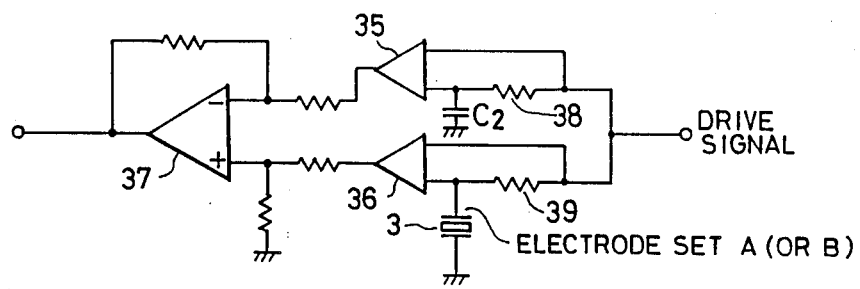
FIG. 12 is a diagram of a circuit for detecting the level of current which flows in the mechanism representing arm of the equivalent circuit of FIG. 10.

FIG. 12 is a circuit diagram of a circuit for detecting the level of this effective drive current. The alternating drive voltage that is supplied to one of the sets of electrodes of the piezoelectric body of the ultrasonic motor (i.e. set A or B shown in FIG. 2 described hereinabove) is applied through two separate circuit paths. One of these paths leads through a resistor 39 to the aforementioned set of electrodes of the piezoelectric body and to one input terminal of a differential amplifier 36. The other circuit path leads through a resistor 38 to a capacitor $C_2$ whose capacitance value is equal to that of one set of electrodes of the piezoelectric body (i.e. set A or B, described hereinabove), and to one input of a differential amplifier 35. The alternating drive voltage is also applied directly to each remaining input of the differential amplifiers 35 and 36. The differential amplifier 36 serves to detect the total current which flows into the electrodes of the piezoelectric body, while the differential amplifier 35 detects the component of that total current which flows through the capacitance of the piezoelectric body electrodes. The resultant outputs from the differential amplifiers 35 and 36 are applied to a subtractor circuit 37, in which the current component which flows through the capacitance of the piezoelectric body electrodes is subtracted from the total drive current, to thereby obtain the level of the effective drive current, expressed as an output voltage level from the subtractor circuit 37. Thus, the output level from the circuit of FIG. 12 represents the level of the current $i_1$ of the equivalent circuit of FIG. 10.

Figure 11:
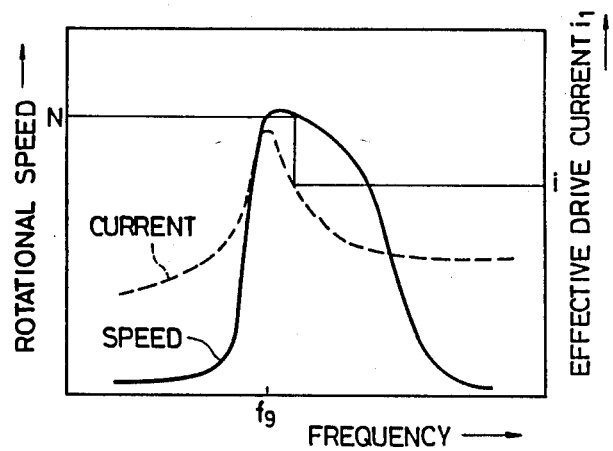
FIG. 11 shows a frequency characteristic of current which flows in an arm of the equivalent circuit of FIG. 10 representing a motor mechanism, and a frequency characteristic of rotational speed of the rotation body, obtained from FIG. 10.

The speed of rotation of the motor will be held constant if the level of this current $i_1$ is maintained constant, e.g. as shown in FIG. 11 if current $i_1$ is held fixed at a predetermined value i, then the speed of rotation of the motor will be held fixed at a corresponding value N. It will thus be apparent that any of the preceding embodiments of the present invention can be changed such as to utilize the level of the current component $i_1$ of the drive current as a control parameter, instead of the phase difference between drive voltage and current. That is to say, the frequency of the alternating drive voltage applied to the piezoelectric body can be controlled such as to maintain this effective drive current $i_1$ at a predetermined value, or within a predetermined narrow range, to thereby stabilize the speed of rotation of the motor against variations in resonance frequency of the vibration body resulting from temperature or load variations.

Similarly, it would be possible to control the frequency of the alternating drive voltage of the motor by detecting the speed of rotation of the rotation body, i.e. by varying the drive frequency such as to maintain the speed of rotation at a constant value or within a predetermined narrow range. In this case it would of course be necessary to provide means for detecting the motor speed of rotation.

However whether control is executed in accordance with the phase difference between drive voltage and current, the effective drive current, or speed of rotation, it is an essential feature of the drive method of the present invention that the frequency of the alternating drive voltage applied to the piezoelectric body of the ultrasonic motor is controlled to be held within a range of frequencies in which stable speed of rotation is ensured, as described in detail hereinabove. Specifically, the drive frequency is maintained within a range extending from a frequency which is higher than the highest value of resonance frequency of the vibration body in the hysteresis loop of a frequency characteristic of the vibration body (e.g. the hysteresis loop displayed by the frequency characteristic of the admittance of the vibration body with respect to the drive frequency applied to the vibration body) resulting from non-linearity of operation of the vibration body, and a frequency which is lower than the antiresonance frequency of the vibration body. In this way, when effective drive current or speed of rotation is used as a control parameter, a fixed relationship will be maintained between the frequency of the alternating drive voltage applied to the vibration body and the resonance frequency of the vibration body, irrespective of changes in that resonance frequency.

What is claimed is:

1. A method of driving an ultrasonic motor comprising a vibration body formed of a piezoelectric body and an elastic body and a rotary body which is disposed in contact with said vibration body, the vibration body being driven to vibrate by an alternating drive voltage which is applied to said piezoelectric body for thereby rotating the rotary body by a frictional force, the method comprising successive steps of:
 (a) sweeping a drive frequency of said vibration body downward from a high end of a predetermined frequency sweep range, said sweep range including at least a frequency range extending between an antiresonance frequency of said vibration body and a highest resonance frequency of said vibration body with respect to a hysteresis loop exhibited by a resonance frequency characteristic of said vibration body;
 (b) detecting when a predetermined operating parameter of said vibration body reaches a specific value thereof which corresponds to a value of said drive frequency that is higher than said highest resonance frequency and lower than said antiresonance frequency
 (c) when said specific value is detected, halting said frequency sweeping to thereby fix the value of said drive frequency;
 (d) monitoring said operating parameter to detect whether the value thereof subsequently deviates from said predetermined value by more than a predetermined permissible range of variation and;
 (e) if deviation of said operating parameter value outside said permissible range of variation is detected, successively repeating said steps (a) through (d).

2. A method of driving an ultrasonic motor comprising a vibration body formed of a piezoelectric body and an elastic body and a rotary body which is disposed in contact with said vibration body, the vibration body being driven to vibrate by an alternating drive voltage which is applied to said piezoelectric body for thereby rotating the rotary body by a frictional force, the method comprising successive steps of;
 (a) sweeping a drive frequency of said vibration body upward from a high end of a predetermined frequency sweep range, said sweep range including at least a frequency range extending between an antiresonance frequency of said vibration body and a highest resonance frequency of said vibration body with respect to a hysteresis loop exhibited by a resonance frequency characteristic of said vibration body;
 (b) detecting when a predetermined operating parameter of said vibration body reaches a specific value thereof which corresponds to said resonance frequency;
 (c) when said specific value is detected, halting said frequency sweeping and fixing of said drive frequency at a value which is equal to the drive frequency value at the point of halting said frequency sweeping, incremented by a predetermined amount, said amount being determined such as to set said drive frequency to a value which is higher than said highest resonance frequency and lower than said antiresonance frequency;
 (d) monitoring said operating parameter to detect whether the value thereof subsequently deviates from said predetermined value by more than a predetermined permissible range of variation and;
 (e) if deviation of said operating parameter value outside said permissible range of variation is detected, successively repeating said steps (a) through (d).

3. A method of driving an ultrasonic motor according to claim 1, in which said operating parameter is selected from a group of operating parameters which include a phase difference between said alternating drive voltage and a resultant current which flows in said piezoelectric body, a level of a predetermined component of said current, and a speed of rotation of said rotary body.

4. A method of driving an ultrasonic motor having a vibration body formed of an elastic body and a piezoelectric body adapted to be driven by an electric field alternating in polarity, and a rotary body disposed in contact with said vibration body to be driven by elastic traveling waves generated in the vibration body, the method comprising the steps of:
 (a) executing frequency sweeping of a drive frequency of said alternating electric field;
 (b) detecting a condition in which a predetermined operating parameter of said ultrasonic motor attains a value corresponding to a value of said drive frequency which is within a specific range that is higher than a frequency range of a hysteresis loop exhibited by said vibration body and is lower than an antiresonance frequency of said vibration body and halting said frequency sweeping when said condition is attained;
 (c) controlling said drive frequency in accordance with said operating parameter to maintain said drive frequency within said specific range; and,
 (d) detecting a condition in which said operating parameter deviates from a range of values thereof corresponding to said specific range, and acting in response to said detection to again execute said steps (a) and (b) of frequency sweeping and drive frequency setting.

5. A method for driving an ultrasonic motor according to claim 4, in which said operating parameter is selected from a group of operating parameters which include a phase difference between said alternating electric field and a current which flows in said piezoelectric body, a level of current which flows in said piezoelectric body, and a speed of rotation of said rotary body.

6. A method of driving an ultrasonic motor according to claim 4, in which said specific range of said drive frequency is higher than a highest value of resonant frequency appearing in an admittance versus frequency characteristic in which said hysteresis loop of said vibration body is exhibited, and is lower than said antiresonant frequency.

7. A method of driving an ultrasonic motor according to claim 4, in which said step (c) of controlling said drive frequency comprises detecting a difference between a measured value of said operating parameter and a predetermined value of said operating parameter, and controlling said frequency such as to minimize said difference.

8. A method of driving an ultrasonic motor according to claim 4 in which said steps (a) and (b) respectively comprise executing frequency sweeping while measuring said operating parameter value and halting said frequency sweeping when said operating parameter value coincides with said predetermined value corresponding to a value of said drive frequency which is within said specific range.

9. a method of driving an ultrasonic motor according to claim 4 in which said step (d) comprises detecting when said operating parameter value deviates from a range thereof corresponding to said specific range of drive frequency and responding to such deviation by again executing said steps (b) and (c).

* * * * *